March 1, 1932.  A. DINA  1,847,644

PHOTOCELL MOUNTING FOR MOTION PICTURE MACHINES

Filed March 31, 1930  6 Sheets-Sheet 1

Inventor
Augusto Dina
By his Attorney
Howard W. Wix

March 1, 1932.   A. DINA   1,847,644
PHOTOCELL MOUNTING FOR MOTION PICTURE MACHINES
Filed March 31, 1930   6 Sheets-Sheet 2
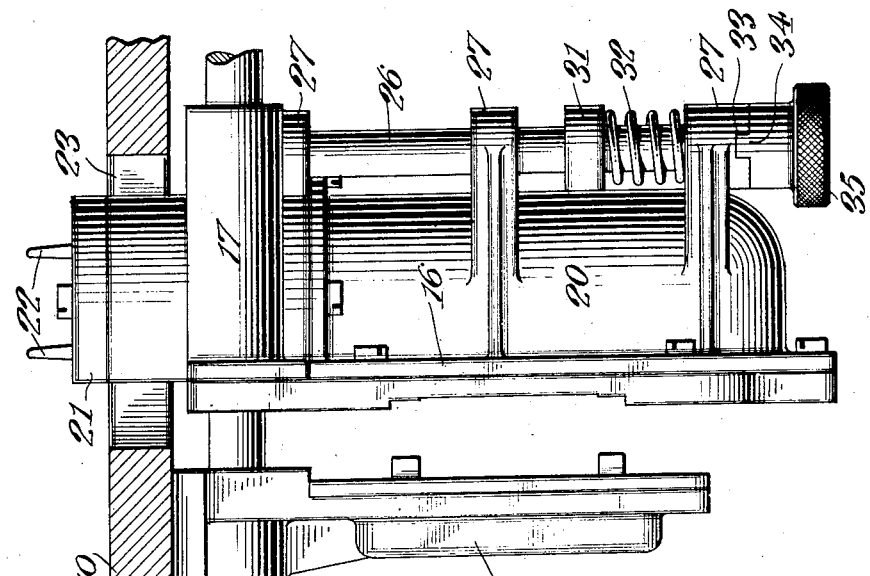
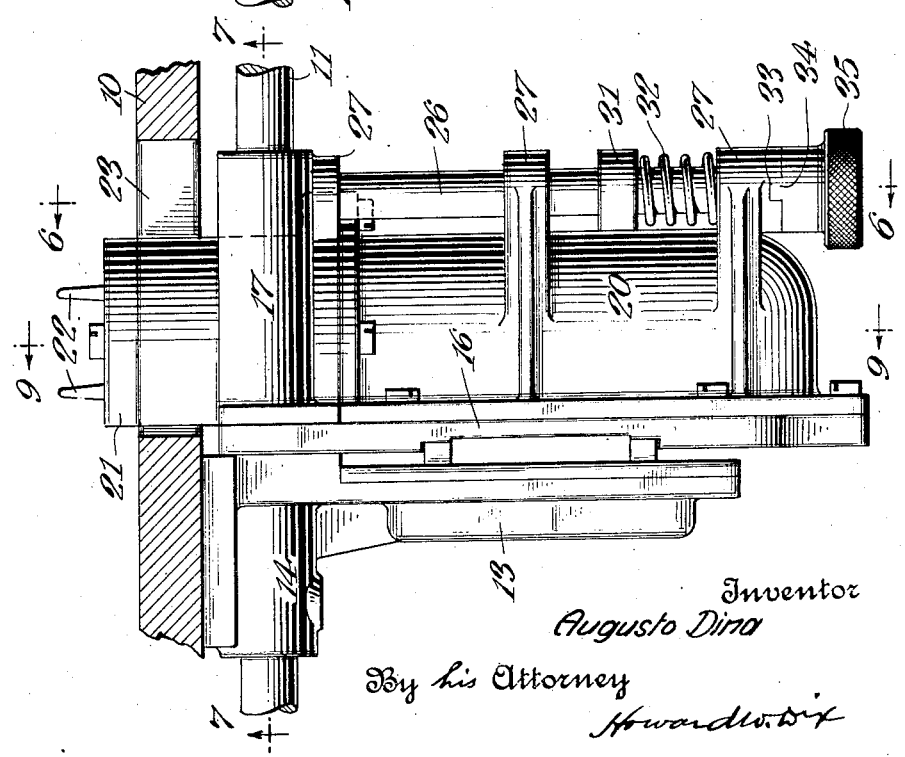
Inventor
Augusto Dina
By his Attorney

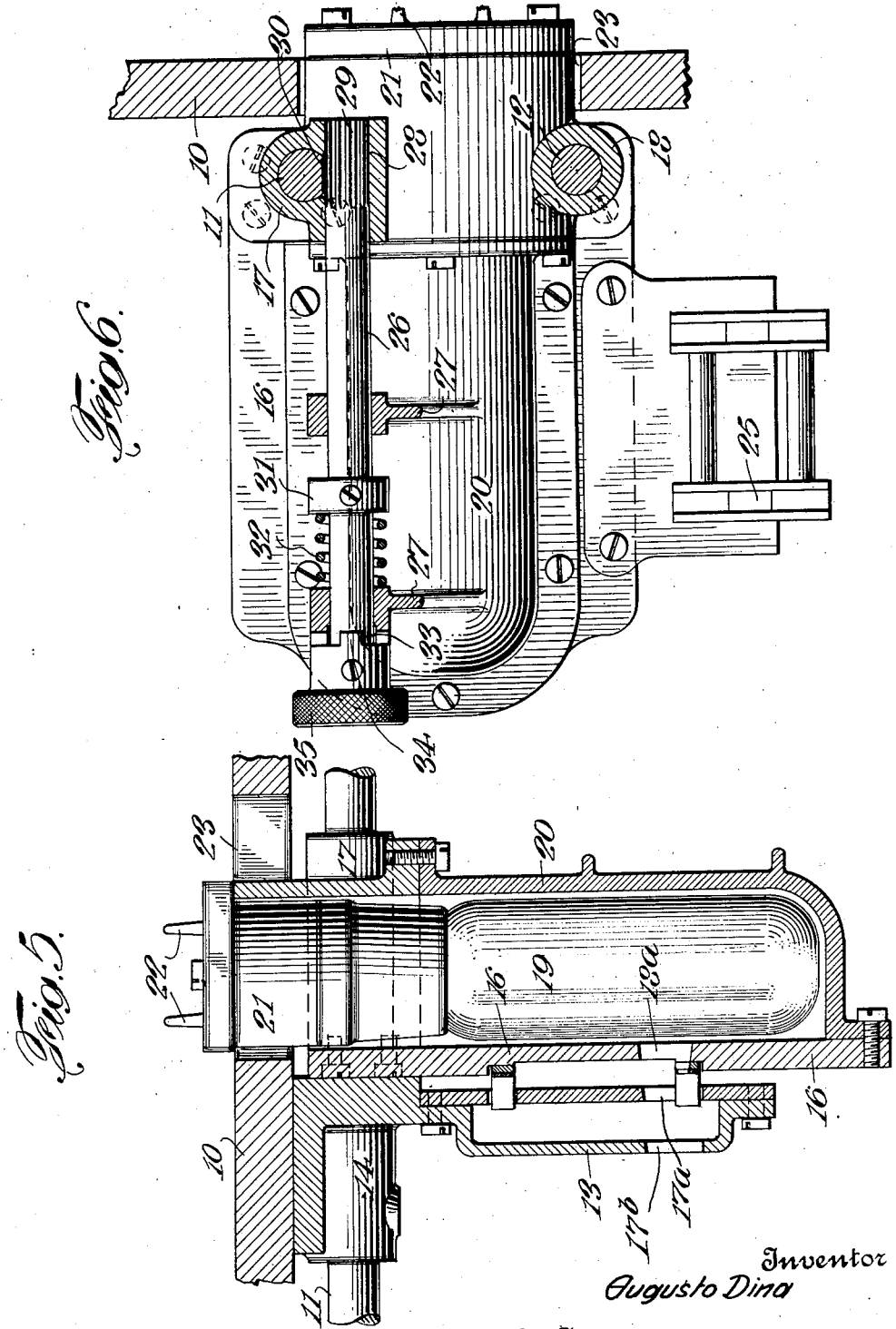

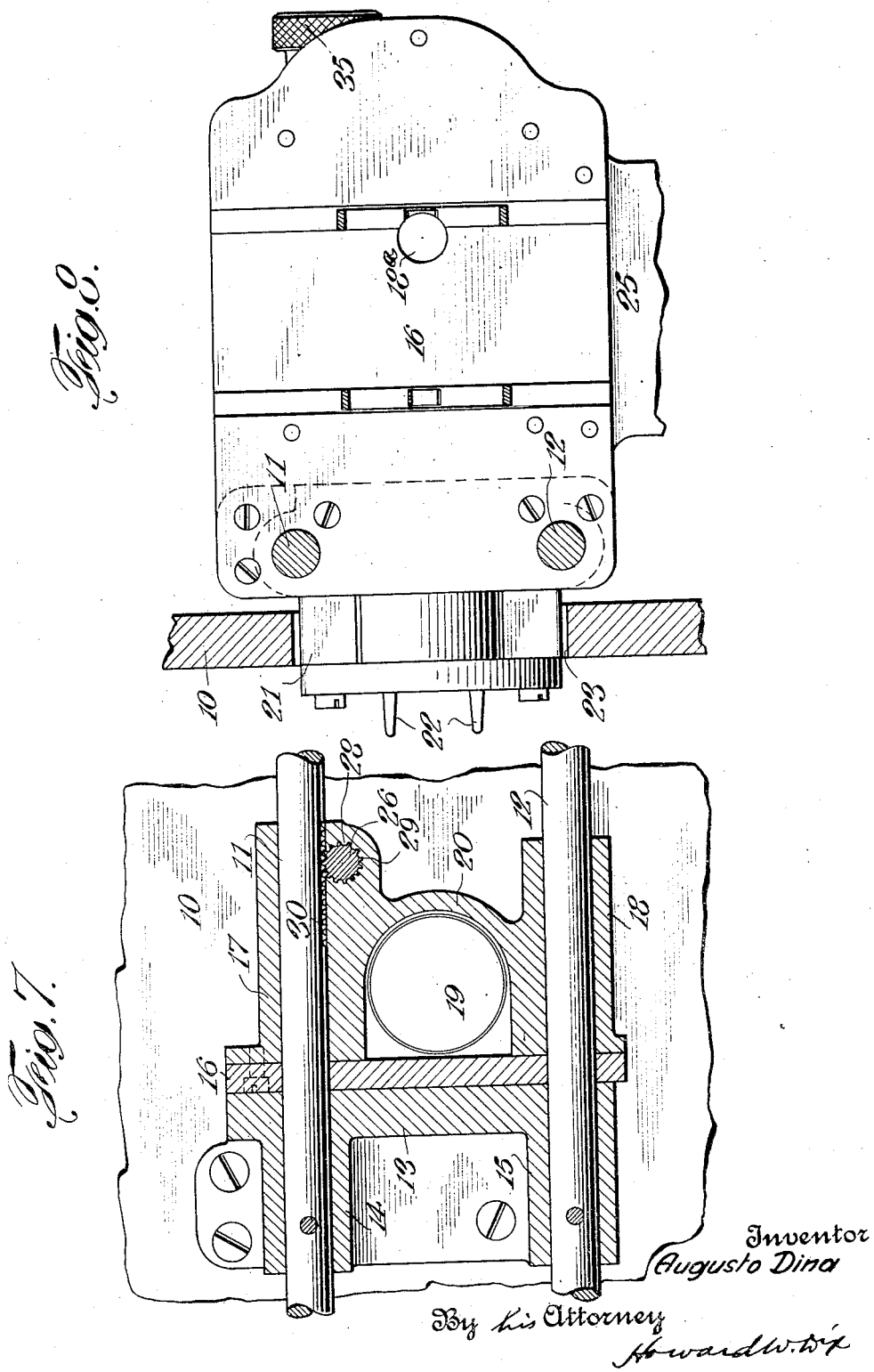

March 1, 1932.  A. DINA  1,847,644
PHOTOCELL MOUNTING FOR MOTION PICTURE MACHINES
Filed March 31, 1930  6 Sheets-Sheet 5
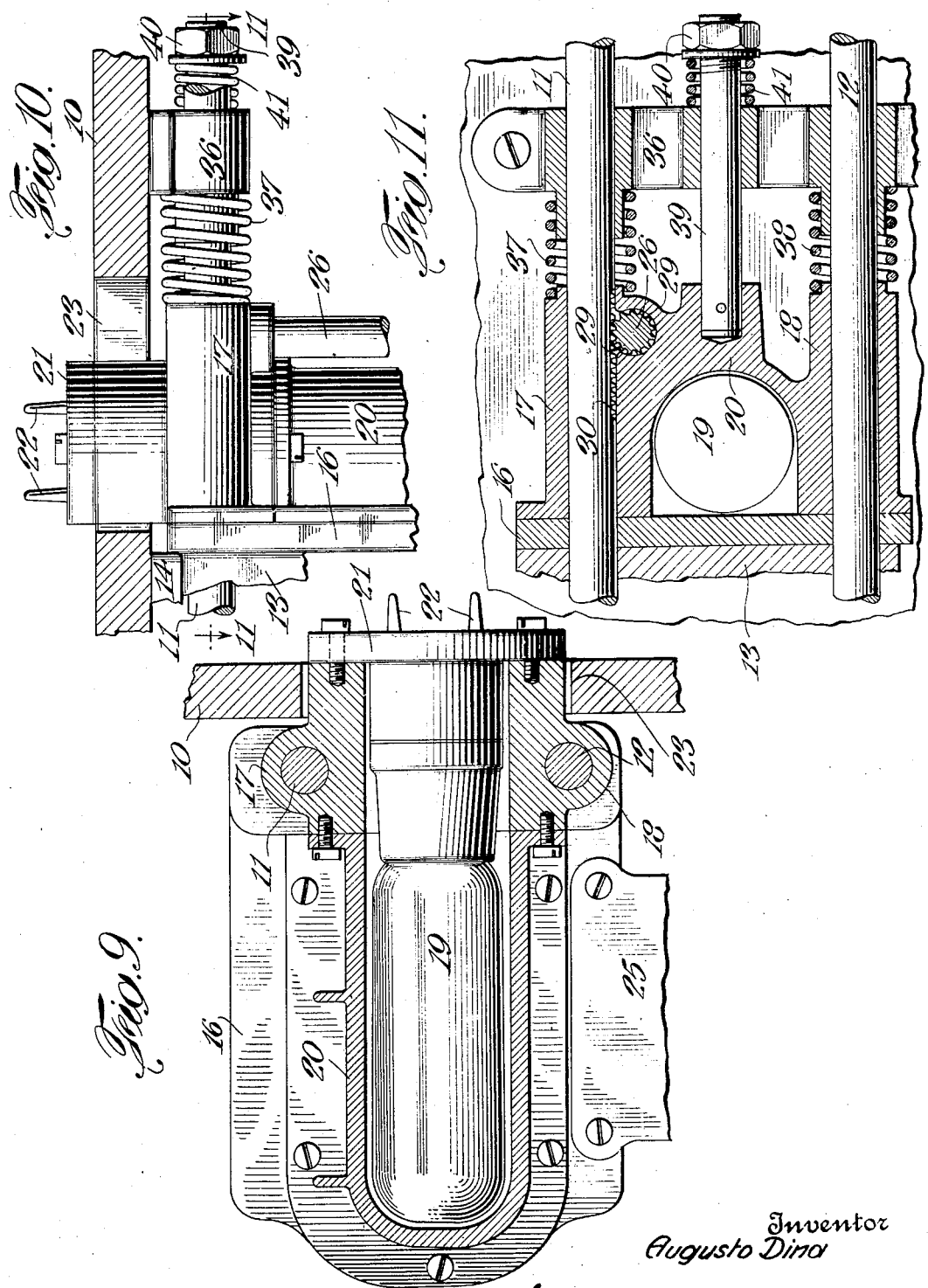
Inventor
Augusto Dina
By his Attorney
Howard W. Dix

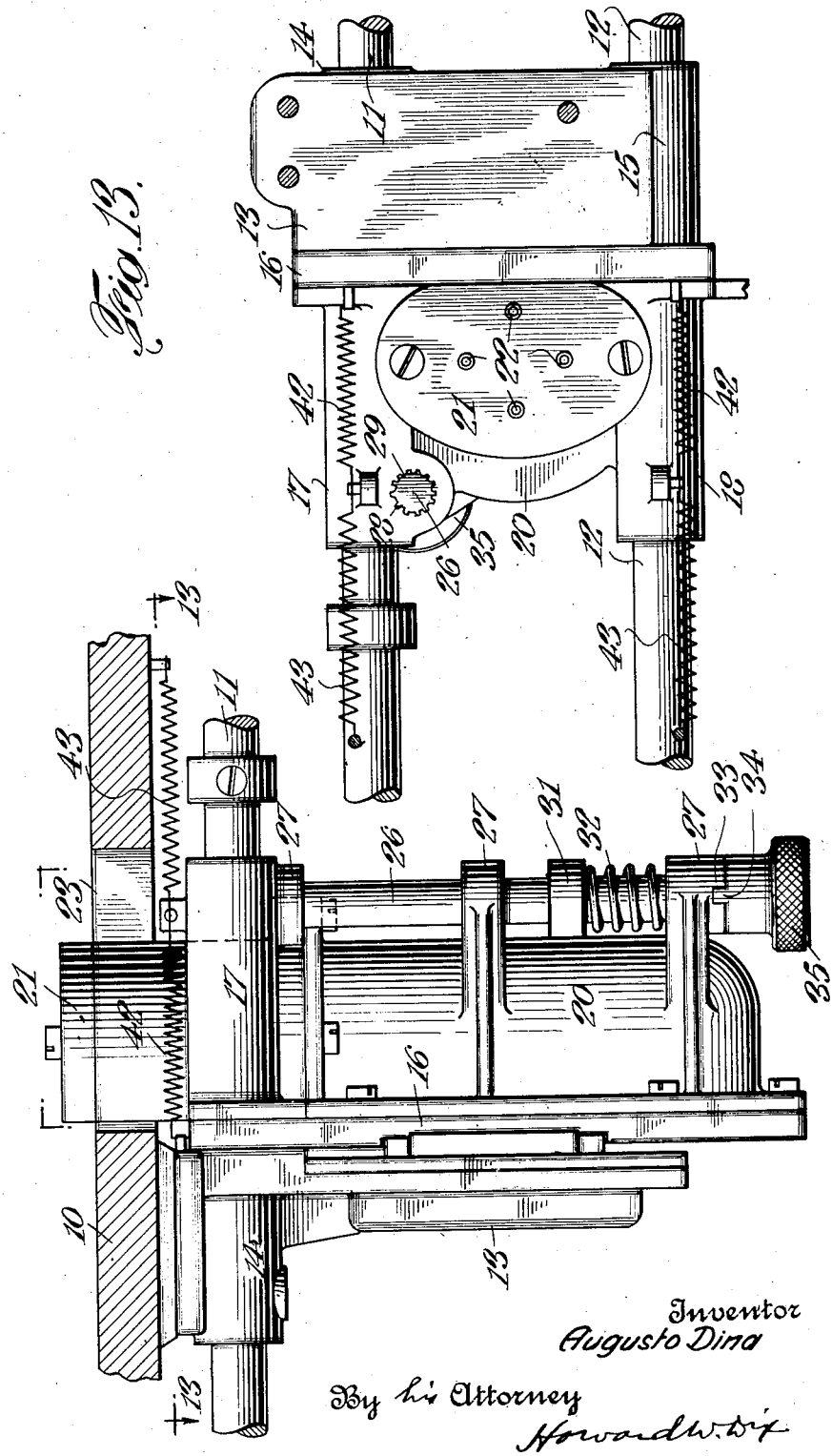

Patented Mar. 1, 1932

1,847,644

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

PHOTOCELL MOUNTING FOR MOTION-PICTURE MACHINES

Application filed March 31, 1930. Serial No. 440,205.

This invention relates to motion picture apparatus and has particular reference to motion picture projectors and especially to a new and useful mounting and adjustment for a lamp in association with a portion of the usual film trap of the machine such as the film gate door.

One of the particular advantages of the invention is to provide a simple structure for supporting a photo-electric cell in position as close as possible to the aperture in the door while allowing for the moving of the door for threading of the film. This improved structure provides for having the lamp right beside the door when the film has been threaded and the door closed.

An object of the invention is to provide a simple, compact, durable, and efficient mechanism whereby a cell may be intimately mounted and adjusted with the movement of the film trap door so as to make the movement of the cell and the door positive, certain, accurate, and so cushioned that the cell will not be damaged by the movement of it with the door as the trap is opened or closed.

An especial object is to provide a simple and efficient mechanism whereby the usual photo cell used in movietone projectors may be mounted as close as possible to the film when the mechanism is ready for operation. For instance this object is accomplished in one way by mounting the cell on the film trap door and arranged to move therewith.

A still further object is to provide a simple and efficient mechanism whereby the movements of the door and the cell are thoroughly cushioned, accurately determined and regulated so that the cell or lamp will always be in predetermined positions with respect to the other elements of the machine with which it is related in function and operation.

Further and more specific objects, features, and advantages will more clearly appear from the detailed description given below when taken in connection with the accompanying drawings which form part of the specification and which illustrate one present preferred form of the invention.

In general terms the invention involves a new and useful improvement wherein the usual photo cell used in movietone work is mounted in a most efficient manner for operation, such for instance as being mounted directly on the film trap door and adapted to move therewith. This photo cell is generally the usual selenium cell although it may be any other device such as an ordinary lamp. The cell or the lamp by thus being mounted wil be disposed much closer to the motion picture film than before for more effective cooperation with the light of the exciter lamp than before. Thus the effectiveness and efficiency of the movietone unit is materially increased over the prior structures.

The invention in addition is concerned with the provision of means in association with the door or moving element so that its movement especially the beginning and the end of its movement in either direction is cushioned in a desirable manner.

Furthermore the invention includes the cooperation with the cell and the door of an especial moving means which will move the door in either direction in a precise regulated manner and will cause the door to be locked in either its fully opened or closed position.

One of the particular descriptions and illustrations of the cell concerns its mounting on and being carried by the door as being one preferred assembly, but in spite of this it will be understood that it is to be mounted in the nearest position to the film when the machine is in operative assembly for transmitting sound. By being mounted on the door it is, as near as possible to the film when accomplishing its intended purpose. It is understood that the door must be moved to allow for threading of the film. In the present construction the cell is moved with the door. However, the gate may be moved to allow film threading and in such an instance the cell and door would not be moved. Again, if the door is to be moved then the cell may be moved out of the path of the door as by pivoting the same or moving it to the side or to the top or dropping it, but always returning the same when the door is closed. Thus the same result is obtained as by the type of mounting disclosed herein. The desired object is to have the lamp or cell positioned close to the aperture in the door when the machine is in running condition, but to have the lamp or cell so mounted that the door may be moved to allow for the threading of the film and then be returned and the lamp be moved to its operating position.

Thus the lamp or cell is disposed when in operative position as close as possible to the film whereas hitherto it has been disposed some distance from the film because of having to allow for the movement of the film trap door. Now, being mounted right on the door itself, the cell moves therewith and is disposed as close to the film as the door itself can get.

The present preferred form of the invention is shown in the drawings, of which,

Fig. 3 is a plan view of the device with the door closed;

Fig. 4 is a similar view of the device with the door open;

Fig. 5 is a horizontal section taken on the line 5—5 of Fig. 1;

Fig. 6 is a vertical cross section taken on the line 6—6 of Fig. 3 in part;

Fig. 7 is a vertical cross section taken on the line 7—7 of Fig. 3;

Fig. 8 is a vertical section taken on the line 8—8 of Fig. 1; Fig. 9 is a vertical section taken on the line 9—9 of Fig. 3;

Fig. 10 is a partial plan view of the modified form of the invention;

Fig. 11 is a section taken on the line 11—11 of Fig. 10;

Fig. 12 is a plan view of a still further modification of the invention; and,

Fig. 13 is a section taken on the line 13—13 of Fig. 12.

Figure 2:
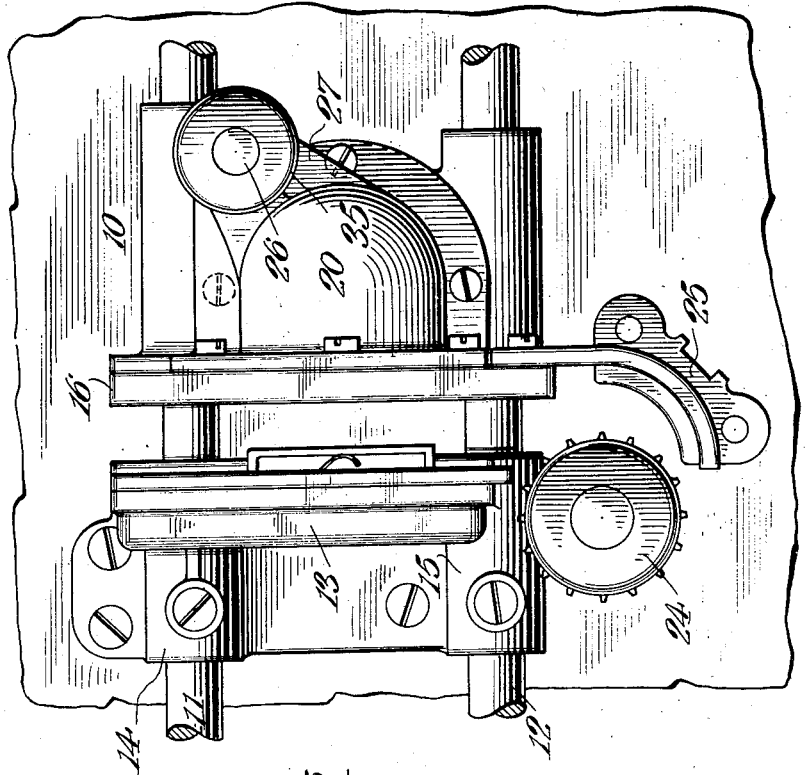
Fig. 2 is a similar view with the door open.

The invention shown in the drawings herein is a present preferred form thereof and is adapted to be associated with the usual movietone picture projector to regulate and determine the operation and position of the photocell or lamp which forms part of the sound producing mechanism on such a machine.

As shown in the drawings, the application of the invention illustrated is a motion picture projector having a mechanism-supporting partition or wall 10 on which are preferably disposed or fixed two horizontal spaced rods 11 and 12. A film trap member such as the gate element 13 is fastened preferably fixedly to the rods by means of collars such as 14 and 15 which may be formed integrally on the gate 13. Adjacent the gate 13 there is normally disposed the usual movable door 16 which is provided with preferably integral collars 17 and 18 embracing the rods 11 and 12 to permit the door 16 to slide therealong so that the door may be moved against the gate 13 or may be moved away from it at will. A film, not shown, is as usual adapted to be run between the gate 13 and the door 16 and when this film is a movietone film there is provided along one side edge thereof a series of striata which are photographic records on the film of certain sounds. When light passes through the film where the striata are disposed its intensity will naturally be varied as the density of the striata vary. This light is allowed to fall upon a cell or lamp of such character that the current passing therethrough is varied as the light falling upon the cell or lamp varies in intensity.

The gate 13 and the door 16 are provided with a suitable aperture or apertures such as 17a, 17b and 18a (see Figs. 5 and 8) properly alined so that light passing therethrough will pass through the striata and will fall upon the filament or any other desired part of a cell or lamp such as 19 suitably housed in a casing 20 formed integrally on the door 16. The socket or base such as 21 of the cell 19 has a terminal such as 22 to which suitable electrical connections may be made. This base preferably projects through the slot or opening 23 in the partition or wall 10 to permit the door and the cell to be moved. The slot is slightly longer than the path of movement of the door and the cell. Preferably the cell is housed on the door 16 right back of the door plate and therefore the lamp or cell 19 will, when the door is in closed position against the gate, be as close as is physically possible to the film which passes between the gate 13 and the door 16. And yet the cell 19 will move with the door since it is mounted thereon.

It is clear then that the utmost efficiency of the light used to penetrate the striata on the film is obtained since after it passes through the film it almost immediately falls upon the cell 19 and affects it in the desired manner. Since the intensity of light varies inversely as the square of the distance the importance of placing the cell 19 as close to the film as possible will be appreciated.

The gate 13 at its bottom is provided with a sprocket such as 24 which is operated in any suitable manner but preferably at uniform speed to draw the film down between the door 16 and the gate 13 and past the apertures 17a and 18a therein. The door 16 is also provided with a suitable guide element such as shoe 25 at the bottom thereof to cooperate with the sprocket 24 to move and guide the film properly.

Figure 1:
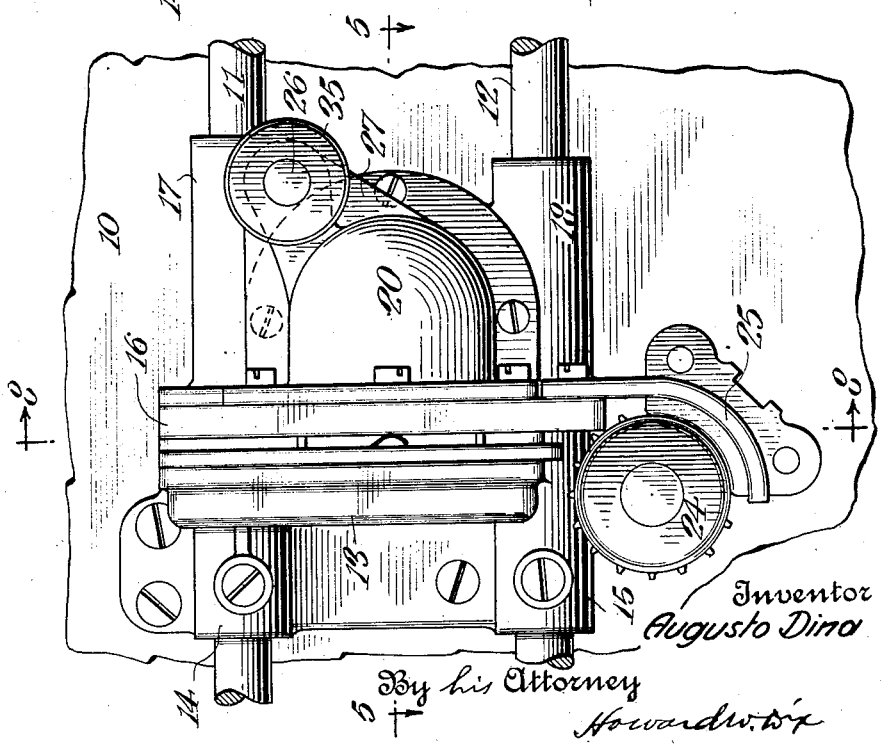
Fig. 1 is a side elevation of the device with the door closed.

It is also very desirable to properly move the door when it has to be opened. It is also proper that the moving means be locked whenever the door is either fully opened or fully closed so that by no means can the door be moved except deliberately. This moving means in its preferred form comprises a shaft 26 journalled in suitable brackets such as 27 formed preferably integrally on the housing or casing 20. They are so disposed as to permit the shaft 26 to extend horizontally and parallel to the length of the lamp 19 along the upper right hand corner of the housing 20 as shown in Fig. 1.

At one end the shaft 26 extends into the collar 17 through a bore 28 therein and has on its end gear teeth 29 formed thereon in any suitable manner. These teeth mesh with rack teeth 30 on the rod 11 so that when the shaft 26 is turned the whole door 16 is moved along its supporting rods 11 and 12. The shaft 26 has a collar 31 thereon intermediate its length. A spring 32 is disposed between this collar 31 and the adjacent face of one of the journals 27. The other face of this journal is provided with a groove such as 33 preferably rectangular in cross section. This groove is adapted to normally receive a similarly shaped tongue such as 34 on the adjacent face of the head or knob 35 on the end of the shaft 26. The spring 32 tends to hold the tongue 34 and the groove 33 in engagement and to hold the shaft 26 to the right-hand position at all times. It will be perceived that when the tongue and groove are engaged they must be disengaged by positively drawing the shaft 26 to the left before the shaft 26 can be turned to move the door 16. The parts are so related and designed that when the door 16 is close to the gate 13 and in the operative position with regard thereto then the tongue 34 and the groove 33 will engage and lock the door 16 in this position. Also when the door 16 is drawn back to its full open position the parts will assume their locked relation again so that when the parts are fully opened or closed they will be locked in this position to avoid any accidental tampering with the parts and the disturbance of the door and the therewith mounted lamp which is to be treated as gently as possible to avoid injury to it.

It will be seen that a portion of the casing or housing 20 can be unscrewed to permit it to be removed so that the lamp can be readily inserted in the socket or base 21.

In the form of the invention shown in Figs. 10 and 11 there is shown a cushioning means whereby the movement of the door into its full open or closed positions may be cushioned to practically avoid shocks or jars to the door and to the lamp 19 mounted thereon. This cushioning means in the forms shown in these figures comprises a collared bracket such as 36 to support the outer right hand end of the rods 11 and 12. Between this bracket and around the rods 11 and 12 are disposed coiled springs 37 and 38. Attached to the door 16 and extending from it to the right through a bore in the bracket 36 there is a rod 39 having a nut 40 on its outer end. Between this nut 40 and the bracket 36 is disposed a spring 41. The springs are so related and designed as to strength and resiliency that when the door 16 is in the closed position, the springs 37 and 38 are slightly extended and the spring 41 is slightly compressed. When the moving knob 35 is operated to disengage the tongue 34 and the groove 33 and is turned slightly then the tendency is for the springs to automatically move the door to a position slightly removed from the gate 13. In this position the springs are supposed to balance each other and the door would stay in this position until positively moved to some other position. When the shaft 26 is turned still further the door 16 is moved further away from the gate 13 and when the tongue and groove are engaged the door will be locked in the outermost position. When in this position the springs 37 and 38 will be compressed and the spring 41 will be stretched. When the door is unlocked then the springs will tend to resume their normal balanced relation again. Thus if left to the springs alone the door will be disposed slightly away from the gate. Thus also in order to move the door to either the open or the closed position a slight spring pressure must be overcome so that the tendency for the door to be moved roughly to open or closed position is reduced to a minimum.

In Figs. 12 and 13 the same idea is involved but the application is different. Here springs 42 extend from the gate 13 to a projection on the door 16 and a spring 43 from this projection to a pin on the wall 10. There are two sets of these springs as shown in Fig. 13 so as to balance the pull on the door 16 as it slides along the rods 11 and 12.

Thus the herein invention provides a simple and compact mount for a lamp or cell used in motion picture machines for the reproduction of sound; it permits, in the broad sense, the cell to be near the door aperture in normal operation of the machine and to be moved to allow the film to be threaded through the machine; it permits the cell to move with the element on which it is mounted; it also permits the cell to be normally disposed as close to the film as is physically possible and thus achieve maximum light efficiency; it also provides a simple and efficient cushioning means whereby the cell when moved from one position to the other is not damaged or injured in any way.

While the invention has been described in detail and with respect to a present preferred form thereof, it is not to be limited to such details and forms since many changes and modifications may be made and the invention embodied in other forms and modifications without departing from the spirit and scope of the invention in its broadest aspects; hence it is desired to cover any and all forms and modifications of the invention coming within the language or scope of any one or more of the appended claims.

What is claimed is:

1. A talking motion picture apparatus which comprises a sound film trap gate and door, a cell mounted on and movable with the door, means for sliding the door to positions against and away from the gate and the film normally disposed therebetween, and means for locking the door sliding means in predetermined positions of its movement.

2. A motion picture apparatus which comprises a film trap gate and door, a cell mounted on and movable with the door, a casing disposed around the cell, means for moving the door to positions against and away from the gate and the film normally disposed therebetween, means for locking the moving means in predetermined positions of its movement, and means for cushioning the door in its movement in either direction.

3. A motion picture apparatus which comprises a film trap gate and door, a cell mounted on and movable with the door, a casing disposed around the cell, means for moving the door to positions against and away from the gate and the film normally disposed therebetween, means for locking the moving means in predetermined positions of its movement, and spring means disposed relative to the door to resist its movement to either end position of its movement.

4. A motion picture apparatus which comprises a film trap gate and door, a cell mounted on and movable with the door, a casing disposed around the cell, means for moving the door to positions against and away from the gate and the film normally disposed therebetween, and spring means disposed relative to the door to resist its movement to either end position of its movement.

5. A motion picture apparatus which comprises a film trap gate and door, a cell disposed on and movable with the door, springs to resist the movement of the door to either end position of its movement, the springs so related as to be balanced when the door is slightly removed from the gate.

6. A motion picture apparatus which comprises a film trap gate and door, a cell disposed on and movable with the door, springs to resist the movement of the door to either end position of its movement, the springs so related as to be balanced when the door is slightly removed from the gate, means for moving the door to and away from the gate, and means for locking the moving means in either end position of its movement.

7. A talking motion picture apparatus which comprises a sound film trap gate and door and a photocell mounted on and slidably movable with the door, and means for locking the door at each end of its travel.

8. A talking motion picture apparatus which comprises a sound film trap gate and door, rods on which the gate and door are slidably disposed, and means for sliding the door along the rods with respect to the gate, said means being adjustable in connection with the rods.

9. A talking motion picture apparatus which comprises a sound film trap gate and door, a cell mounted in association with the door for normal operation, a common support for the gate, the door, and the cell, said support removably mounted on the machine and permitting the removal of the gate the door and the cell from the machine as a unit.

10. A motion picture apparatus which comprises a film trap gate and door, a photo cell associated with the door and movable therewith, a series of rods to support the gate, the door and the cell, said elements being slidably adjustable along said rods, spring means to cushion the door in its movement with respect to the gate, said springs balanced to tend when free to hold the door slightly from the gate, locking means to lock the door in the extreme end positions of its travel, and means for moving the cell when the door is removed from the gate, the cell otherwise being disposed as close to the aperture in the gate as possible during normal operation.

AUGUSTO DINA.